United States Patent
Saada et al.

(10) Patent No.: US 9,327,835 B2
(45) Date of Patent: May 3, 2016

(54) AIRPLANE SEAT PROVIDED WITH A REINFORCING STRIP FOR ABSORBING IMPACTS

(75) Inventors: Benjamin Jacob Saada, Marseilles (FR); Jean-Charles Marcel Samuelian, Paris (FR); Vincent Tejedor, Merignac (FR)

(73) Assignee: EXPLISEAT, Paris (FR)

( * ) Notice: Subject to any disclaimer, the term of this patent is extended or adjusted under 35 U.S.C. 154(b) by 19 days.

(21) Appl. No.: 14/008,051

(22) PCT Filed: Mar. 26, 2012

(86) PCT No.: PCT/EP2012/055345
§ 371 (c)(1),
(2), (4) Date: Sep. 27, 2013

(87) PCT Pub. No.: WO2012/130809
PCT Pub. Date: Oct. 4, 2012

(65) Prior Publication Data
US 2014/0015290 A1   Jan. 16, 2014

(30) Foreign Application Priority Data
Mar. 30, 2011 (FR) ..................................... 11 00937
Jun. 16, 2011 (FR) ..................................... 11 01840

(51) Int. Cl.
*B64D 11/06* (2006.01)
*B64D 25/04* (2006.01)
(Continued)

(52) U.S. Cl.
CPC .............. *B64D 11/06* (2013.01); *B60N 2/4221* (2013.01); *B60N 2/7011* (2013.01); *B64D 11/0619* (2014.12); *B64D 11/0647* (2014.12); *B64D 25/04* (2013.01); *Y02T 50/46* (2013.01)

(58) Field of Classification Search
CPC ............ A47C 7/22; A47C 7/282; A47C 5/06; B60N 2/4221; B60N 2/4242; B60N 2/7011; B60N 2/42709; B64D 25/04; B64D 2011/0627; B64D 2011/0682; B64D 11/0647; B64D 11/0619
USPC ............. 297/216.13, 216.14, 230.11, 452.13, 297/452.56
See application file for complete search history.

(56) References Cited

U.S. PATENT DOCUMENTS 324,839 A    8/1885  Hazen
2,725,096 A * 11/1955  Granby .................... A47C 4/30
                                              297/440.11
(Continued)

FOREIGN PATENT DOCUMENTS

BR       8603369 A    7/1986
DE       42 22 222 C2  6/1994
(Continued)

OTHER PUBLICATIONS

International Search Report for PCT/EP2012/055345 dated May 3, 2012.
(Continued)

*Primary Examiner* — Ryan Kwiecinski
(74) *Attorney, Agent, or Firm* — Pearne & Gordon LLP

(57) ABSTRACT

A seat for an airplane is provided that makes it possible to absorb, in the event of a frontal impact of the airplane, the rocking to which a passenger in a seat located behind the seat is subjected. The backrest of the seat is provided with a reinforcing strip placed behind the backrest. The seat portion can also be provided with a second reinforcing strip placed under the seat portion. The reinforcing strip includes knitted or woven textile. In the case of knitting, the yarn used has a high tenacity, and the knitting stitch can advantageously be the Jersey stitch. In the case of weaving, the weft and warp threads have approximately the same tenacity.

16 Claims, 4 Drawing Sheets

Figure 1:
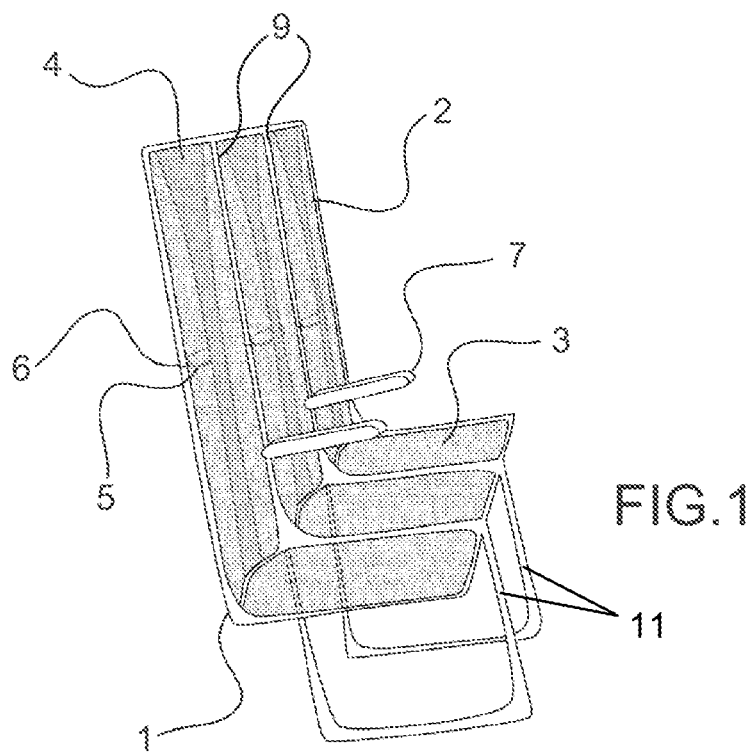

(51) Int. Cl.
*B60N 2/42* (2006.01)
*B60N 2/70* (2006.01)

(56) References Cited

U.S. PATENT DOCUMENTS

| | | | |
|---|---|---|---|
| 3,744,843 A | 7/1973 | Barecki | |
| 4,375,300 A | 3/1983 | Long et al. | |
| 4,994,317 A * | 2/1991 | Dugan et al. | 442/72 |
| 5,403,067 A * | 4/1995 | Rajaratnam | A47C 7/46 297/230.11 |
| 6,241,188 B1 * | 6/2001 | Simpson | B60N 2/6027 244/122 R |
| 6,402,244 B1 | 6/2002 | Schonenberg | |
| 6,485,098 B1 * | 11/2002 | Vits | B60N 2/688 297/216.13 |
| 6,561,580 B1 * | 5/2003 | Bergey | B60N 2/4242 297/216.1 |
| 7,222,915 B2 * | 5/2007 | Philippot | B60N 2/70 297/216.13 |
| 2004/0232743 A1 * | 11/2004 | Fujita | B61D 33/0014 297/216.1 |
| 2005/0116527 A1 * | 6/2005 | Leguen | A47C 3/02 297/452.56 |
| 2006/0055225 A1 * | 3/2006 | Yasuda | B60N 2/58 297/452.18 |
| 2006/0186723 A1 | 8/2006 | Kawabata | |
| 2007/0051850 A1 * | 3/2007 | Peck | B64D 25/04 244/122 R |
| 2008/0290715 A1 | 11/2008 | Fullerton | |
| 2011/0043008 A1 * | 2/2011 | Reel | B60N 2/4228 297/216.13 |
| 2011/0108666 A1 * | 5/2011 | Pozzi | B64D 11/06 244/118.6 |
| 2013/0026803 A1 * | 1/2013 | Islam | B60R 21/207 297/216.13 |
| 2013/0269823 A1 * | 10/2013 | Baumeler | D03D 13/004 139/420 R |
| 2013/0341975 A1 * | 12/2013 | Schneider | B64D 11/06 297/163 |
| 2015/0091281 A1 * | 4/2015 | Nagasawa | B60N 2/4228 280/730.1 |

FOREIGN PATENT DOCUMENTS

| | | |
|---|---|---|
| DE | 20 2004 008 069 U1 | 9/2004 |
| EP | 0 847 917 B2 | 6/1998 |
| EP | 1 134 313 A2 | 9/2001 |
| EP | 1 332 914 B1 | 1/2003 |
| GB | 817264 A | 8/1998 |
| GB | 2 407 968 B | 5/2005 |
| JP | H06-262994 A | 9/1994 |
| JP | H06-299435 A | 10/1994 |
| JP | H07-069110 A | 3/1995 |
| JP | H08-091171 A | 4/1996 |
| JP | 2001-253314 A | 9/2001 |
| JP | 2003-313759 A | 11/2003 |
| JP | 2004-315984 A | 11/2004 |
| JP | 2005-306159 A | 11/2005 |
| WO | 85/02384 A1 | 6/1985 |
| WO | 2007/136578 A3 | 11/2007 |
| WO | 2010/112875 A2 | 10/2010 |

OTHER PUBLICATIONS

Translation of Office Action issued in Japanese Patent Application No. 2014-501564 dated Jan. 25, 2016.

* cited by examiner

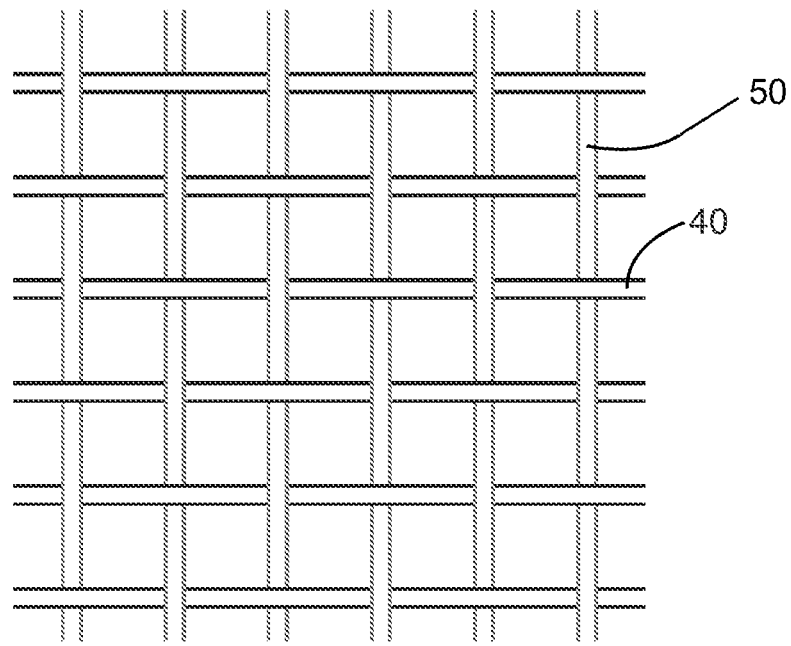
FIG. 6
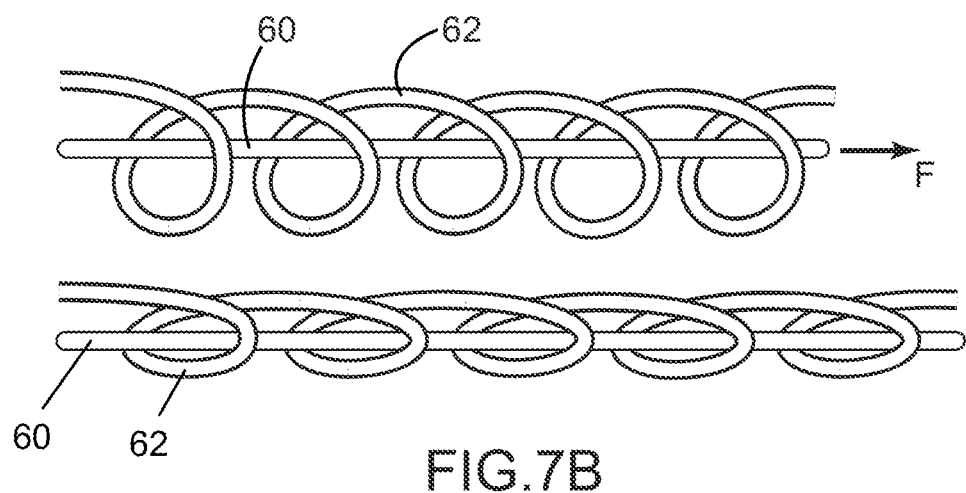
FIG. 7A
FIG. 7B

AIRPLANE SEAT PROVIDED WITH A REINFORCING STRIP FOR ABSORBING IMPACTS

TECHNICAL FIELD

The present invention belongs to the field of the manufacture of airplane cabin fittings, for general aviation, commercial aviation, helicopters or military aviation. It relates more particularly to the realisation of an airplane seat supporting one or more passengers and equipped with means of absorbing impacts for the passenger situated on the seat behind (front impact), or at the level of the seat portion (downward impact).

BACKGROUND

The volume of the seats of airplanes is a preoccupation that aims to respond to the increase in the number of passengers transported every year. By reducing the unit volume of the seats, it is possible to reduce the spacing between two rows of seats and to increase the number of passengers that can fit inside airplanes, or quite the contrary, to increase the space allotted to each passenger or that allotted to goods. A better filling of the plane makes it possible, at constant flow of passengers on an airline, to reduce the number of flights: the fuel saved reduces accordingly discharges of greenhouse gases.

The reduction in the volume of the seats must not reduce the safety of the passengers transported. Safety standards relating to airplane seats are drastic, particularly in terms of impact resistance.

This constraint, which is the resistance and the cushioning of the passenger in the event of impacts, has for a long time led to making airplane seats intended for passengers using a metal structure and deformable cushions. The structure, consisting of a large number of metal parts, is particularly resistant in the event of impacts. But these structures are dense and make the seats quite heavy. The deformable cushions, situated at the level of the seat portion and the backrest, enable good cushioning of the passenger. But they are also quite dense and increase the total weight of the seat.

The complexity of this type of seat raises several problems, during its manufacture, its maintenance, or for the monitoring of the different parts. The greater the number of parts composing the airplane seat, the more the logistics and the manufacturing process of said seat are complex and costly. The fixings together of these different parts are often metal (typically made of stainless steel), to satisfy safety standards, and make the seat heavier. Finally, as regards the conception of the seat, each part having to satisfy safety standards, a reduction in the number of parts limits the tests to be carried out and thus the total time required for the certification of the seat. A reduction in the number of parts thus enables a reduction in the volume and the weight of the seat.

Moreover, said seats historically integrate costly functions, in weight and value terms, which are no longer adapted to the configurations of present cabins. The tilting of the backrest, for example, can no longer be used when the space between the rows of seats is reduced.

A seat skeleton, of low weight, combined with a flexible backrest, enables these drawbacks to be overcome. The shape of the seat combines the comfort of the passenger, particularly by the backrest, and optionally the seat portion, flexible, and the mechanical strength of the skeleton, in order to respect the standards in force in the transport of passengers by air. It dissociates the structural strength, assured by a single rigid component forming the skeleton, and the seat portion and the backrest of the passenger, made of a flexible material.

Nevertheless, the constraint of cushioning the passenger in good safety conditions must always be respected. The aim of the invention is thus to provide the airplane seat according to the invention with means of cushioning the passenger located behind the seat, in the event of frontal impact of the airplane, the head of said passenger situated behind rocking against the rear of the backrest of the seat situated in front of him. In the same way, an absorption means placed at the level of the seat portion makes it possible to retain the passenger in the event of downward impact of the airplane.

SUMMARY OF THE INVENTION

To this end, the main subject matter of the invention is an airplane seat in which the mechanical strength of its structure is assured by a skeleton, comprising in particular voids at the level of the seat portion and optionally the backrest.

According to the invention, it comprises a reinforcing strip made of energy absorbing textile, situated, in a first embodiment of the invention, slightly set back in relation to the backrest, and placed behind the latter, to absorb the rocking of the head of the passenger behind in the event of violent frontal impact of the airplane. A same reinforcing strip may be placed at the level of the seat portion to absorb downward impacts, very important in the case of helicopters. The seat may be equipped with these two strips.

In one of the two main embodiments according to the invention, the energy absorbing textile consists of a knitting of single yarn structure.

In this case, it is advantageous that the knitting is of the Jersey stitch type.

A variant of this first embodiment is to use several yarns in parallel for the knitting.

In the second main embodiment of the invention, the energy absorbing textile is woven with weft yarns and warp yarns.

It is preferable that the weft yarns and warp yarns have approximately the same strength.

In a variant of this second main embodiment according to the invention, the yarn consists in fact of a tight elastic yarn surrounded by a loose yarn but having high tenacity.

In this case of a variant using tight elastic yarn surrounded by a loose yarn with high tenacity, it is advantageous that the tight elastic yarn is made of polyamide (for example Nylon®).

The materials used to constitute the energy absorbing textile of the reinforcing strip are from the group constituted of polyetherimide fibres, polyetherketone fibres, high molecular weight polyethylene fibres, meta- and para-aramid fibres, natural fibres (linen, hemp, jute, etc.) and polyamide fibres.

LIST OF FIGURES

Figure 2:
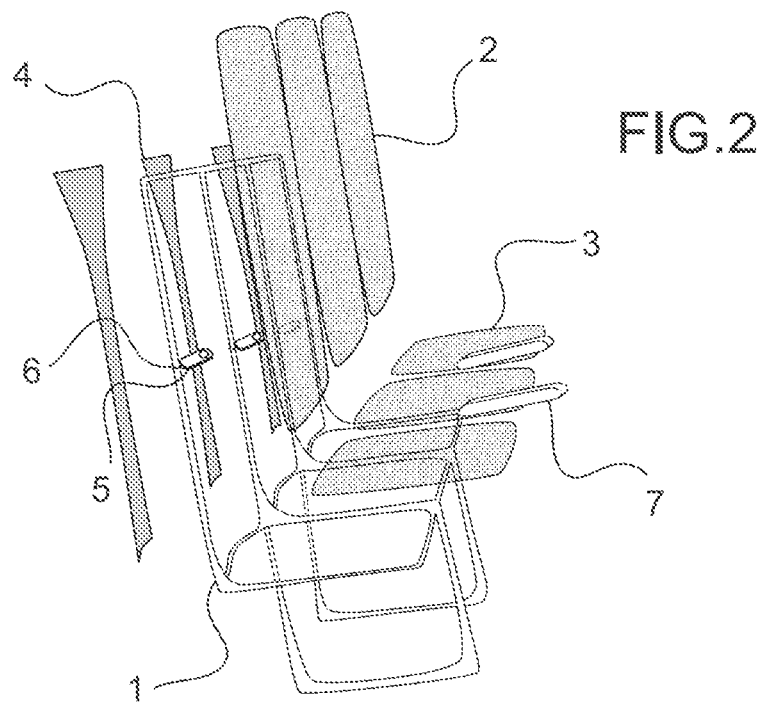
Figure 3:
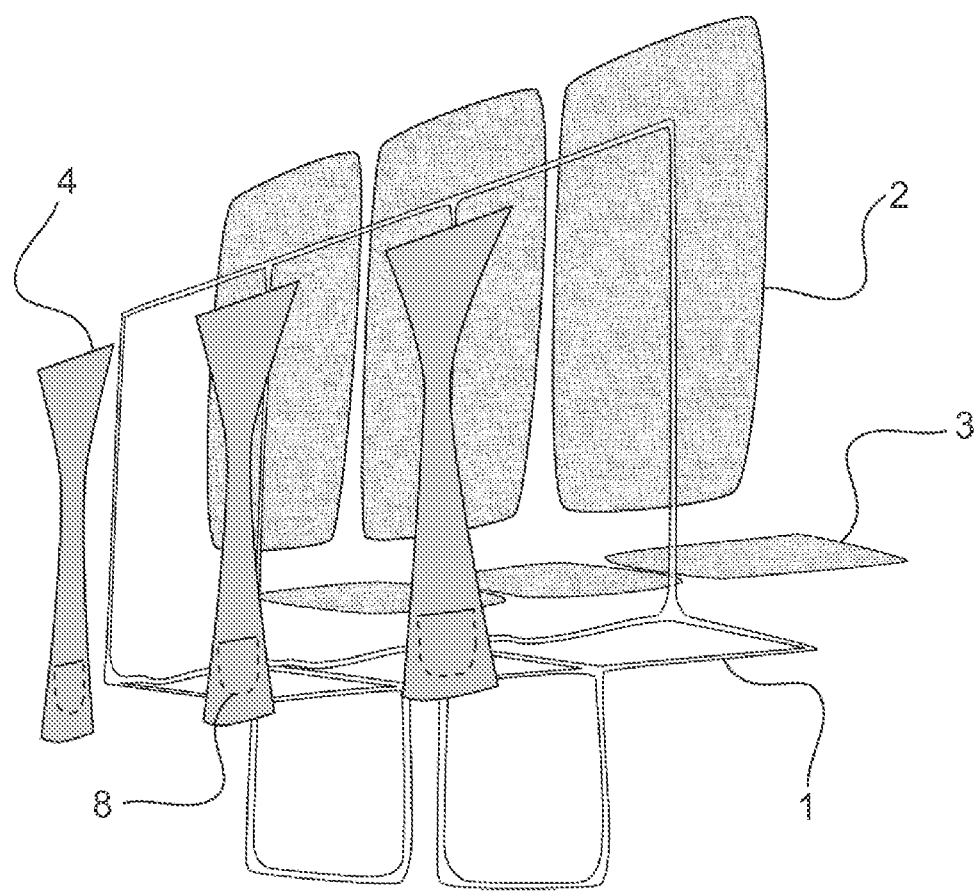
Figure 4:
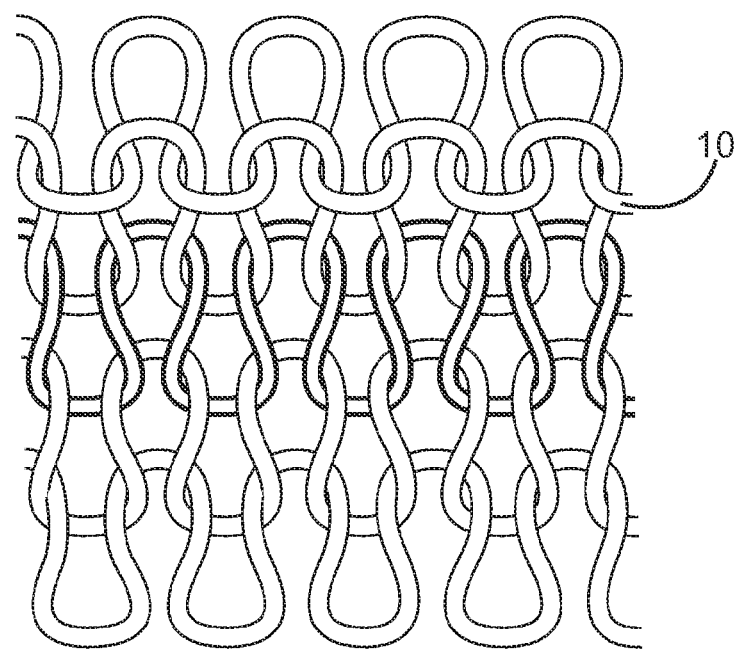
Figure 5:
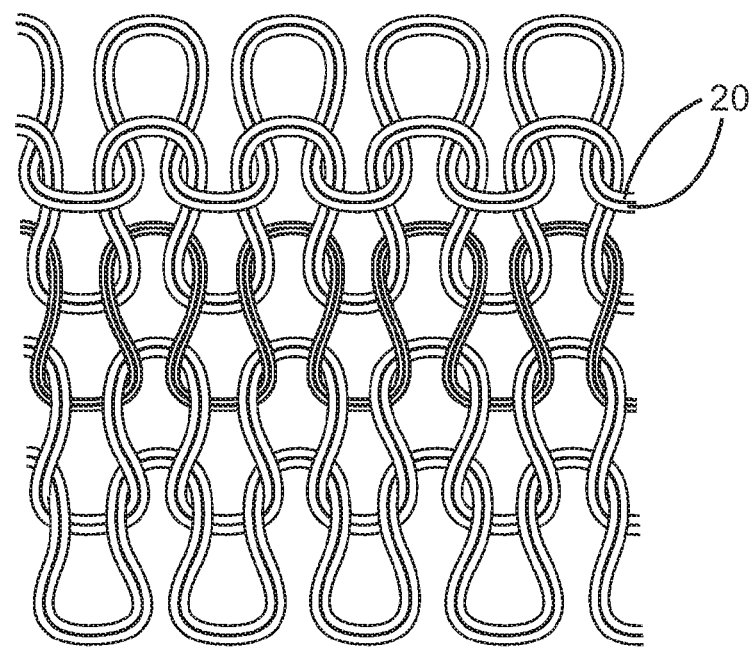

The invention and its different technical characteristics will be better understood on reading the following description illustrated by eight figures which are as follows:

FIG. 1, in cavalier view, from the side and slightly from the front, a seat according to the invention;

FIG. 2, the same seat as FIG. 1 with the same orientation, but in exploded view;

FIG. 3, the same seat as that of the two preceding figures, in cavalier view and rear view, still in exploded view;

FIG. 4, diagram of the knitting used for the reinforcing strip of the seat according to the invention;

FIG. 5, a variant of the knitting used for the reinforcing strip of the seat according to the invention;

FIG. 6, a diagram of the weaving used for the reinforcing strip of the seat according to the invention, and FIGS. 7A and 7B, views relative to a variant of the yarn used for the weaving of the reinforcing strip of the seat according to the invention.

DETAILED DESCRIPTION OF THE INVENTION

With reference to FIG. 1, the seat according to the invention is formed of a skeleton 1, which may be moulded, formed or assembled depending on the choice of the material, and two flexible parts forming the backrest 2 and optionally the seat portion 3. A seat for the transport of passengers by airplane fulfils several functions: dynamic resistance to impacts and strong accelerations, seat portion and backrest of the passenger, support for various accessories (small fold-down table, magazine rack, arm rests, etc.). Each of these functions corresponds to a component of the seat that can be optimised separately to reduce the volume and the total weight of the seat.

The first function of the seat is structural strength. This function is in the case of the invention assured by a skeleton. Skeleton is taken to mean the rigid part of the seat which confers thereto the structural strength: the backrest 2, the seat portion 3 as well as the securement points of the accessories do not play this role. The skeleton of a seat is usually hinged, but may be lightened while becoming rigid.

This FIG. 1 shows a minimum skeleton 1 of the seat, formed of a hollow tubular structure. The attachment points are situated on the part of the seat connected to the floor of the airplane. In the case of a seat for three persons, as represented in FIG. 1, the two central vertical bars 9 at the centre of the backrest may be directly connected to the attachment points of the seat on the floor of the airplane in the case of a non-hinged backrest, in order to minimise the weight of the skeleton.

This fixing to the floor of the airplane may take place directly, for example by insertion of two lower bars 11 of the skeleton 1 in rails fitted in the floor of the airplane, or indirectly, by fixing to a rigid intermediate structure. The latter is secured to the floor of the airplane. The use of a rigid airplane structure makes it possible to facilitate the installation and the upkeep of the seats.

The second function of the seat is the accommodation of the passenger. The backrest 2 and the seat portion 3 of the seat are the parts directly in contact with the passenger and may not contribute to the structural strength of the seat. These parts are fixed onto the structure of the seat itself, but can be much thinner, in order to minimise the total weight of the seat. The backrest 2, and optionally the seat portion 3, are made of a flexible material. A weaving of high tenacity polyester for example may be suitable. The stitching of the fabric makes it possible to obtain an ergonomic shape, marking out in particular the hollow of the back and the hips.

FIG. 2 shows the addition of the backrest 2 and the seat portion 3 to the skeleton 1 of the seat. These parts are very light, consisting of a flexible material such as a weaving of polyester fibres. A strip made of flexible material 4, the manufacture of which will be detailed hereafter, with different properties and consisting of an energy absorbing textile, is added behind the backrest 2 because the material constituting the latter does not make it possible to cushion sufficiently the passenger in the event of violent impact. An identical strip (not represented) may optionally be added under the seat portion 3 if the seat has to withstand important downward impacts.

In FIGS. 1 and 2, accessories secured to the skeleton 1 of the seat are also shown. They could be in particular cup holders 5 and 6, armrests 7.

FIG. 3 shows the same seats, still in exploded view, but seen from behind. The skeleton 1, the backrest 2, the seat portion 3, and the reinforcing strip 4 placed behind the backrest 2 may be seen therein. It is provided with a rack 8 that can be used to place, among others, magazines or safety instructions.

The main technical characteristic of the invention is the use of the reinforcing strip 4 which must be much more deformable than the backrest 2, and also much more resistant. The backrest 2 must have a void in the middle of the skeleton 1 or have a concave rear face to arrange a space for the deformation of the reinforcing strip 4, during the impact.

The principle of the realisation of the fabric constituting the reinforcing strip 4, and the strip optionally added under the seat portion, is to combine a highly resistant and not very extensible fibre, in other words of high tenacity or breaking strength, with an elastic shaping, in order to be able to absorb, smoothly, an impact. During the latter, the textile deforms to hug the shape of the object to be stopped, namely the head of the passenger situated on the seat located behind the seat on the backrest of which is placed the reinforcing strip considered. The textile resists the object in a uniform manner, thereby absorbing the impact. In fact, the energy transferred during the impact is spread out over the whole contact surface between the textile and the object, and not uniquely at the point of impact. The pressure exerted is greatly reduced, limiting the stresses that the object undergoes.

The fibre chosen is agglomerated into yarns to enable a textile shaping. Several fibres may be agglomerated within a same yarn. The simplest yarn is only composed of high tenacity fibres, such as para-aramid fibres (Kevlar® or Twaron®), polyetherimide fibres (Ultem®), polyetherketone fibres (PEEK®), polyamide fibres (Nylon®), natural fibres (linen, hemp or jute) or high molecular weight polyethylene fibres (Dyneema® or Spectra®). The tenacity measures the tensile force that it is necessary to exert to break a fibre. The greater the tenacity, the more the fibre resists high tensile forces. If the textile needs to have additional qualities, it is possible to mix several fibres in the same yarn, by adding thereto, for example, meta-aramid (Nomex®) fibres for fire resistance.

Once the yarn constituted, the latter is shaped to give a textile. Two major techniques are possible, in other words knitting or weaving. Knitting only uses a single yarn for the textile surface, whereas weaving mixes several weft and warp yarns. Weaving may be used for mixing several types of yarns, but limits the strength of the textile, because the discontinuities of yarns are weak points of the textile.

Knitting makes it possible to assure an excellent mechanical strength in the resulting textile, but limits the shaping possibilities. In fact, the knitted textile cannot be cut and sewn to other parts of textiles, without the mechanical performances of the knitting being altered.

With reference to FIG. 4, in the case knitting, the Jersey type stitch makes it possible to obtain a relatively deformable textile. The Jersey stitch consists in making one plain then one purl row. The yarn 10 is wound around itself, from one line to the next, the loops leaving large empty spaces in the textile surface.

When a tension is exerted on the knitted textile, the loops of yarns can deform, conferring a certain elasticity to the whole. If the tension is important, and exceeds the deformation possibilities of the stitches, the yarn is tensile loaded, and the tenacity of the yarn is brought into play. The fact that a single yarn is used for the whole of the knitting avoids the textile tearing from a point of rupture of the yarn, or at the interface between two yarns.

With reference to FIG. 5, an implementation variant of knitting, represented in FIG. 1, consists in knitting several yarns 20 in parallel for the same textile. The stitch remains the same, but instead of only using a single yarn, several yarns constitute each stitch. Each of the yarns 20 is continuous over the entire surface of the textile, but the properties of the yarns can combine together. Examples are, in particular, the fire resistance, the mechanical strength or the water-repellent character. This variant is simpler to implement than mixing fibres within a same single yarn, but does not mingle the different fibres as intimately. The use of fine yarns makes it possible to increase the interactions between each fibre. Here, again, the Jersey stitch may be used.

With reference to FIG. 6, the other alternative of the principle idea, according to the invention, consists in weaving together different yarns which are weft yarns 40 and warp yarns 50. The weft 40 and warp 50 yarns may be different, but it is necessary to ensure that the mechanical strength of each of said weft 40 and warp 50 yarns is equivalent. Nevertheless, a direction may be favoured compared to the other. The weaving may be relatively loose and enable a certain play between the weft 40 and warp 50 yarns. This play gives an elasticity to the textile linked uniquely to the re-arrangement between the yarns and not to the elasticity of the fibres constituting the yarns. An example of embodiment may be a plain weave where the weft and the warp are symmetrical, made of para-aramid yarns (Kevlar® or Twaron®), polyetherimide yarns (Ultem®), polyetherketone yarns (PEEK®), polyamide yarns (Nylon®), natural fibres (linen, hemp or jute) or high molecular weight polyethylene yarns (Dyneema® or Spectra®).

To increase the elasticity of the weaving, it may be judicious to use once again two yarns to constitute the weft and two yarns to constitute the warp. With reference to FIG. 7A, a central yarn 60 that is elastic is used, whereas another high tenacity yarn 62 surrounds it in a very broad manner. The elastic yarn 60 may be, for example, a nylon yarn (polyamide 6-6). The high tenacity yarn 62 may be a para-aramid yarn (Kevlar® or Twaron®), polyetherimide yarn (Ultem®), polyetherketone yarn (PEEK®), polyamide yarn (Nylon®), natural fibres (linen, hemp or jute) or a high molecular weight polyethylene yarn (Dyneema® or Spectra®). The high tenacity yarn 62 is wound or twisted around the elastic yarn 60 which is central.

With reference to FIG. 7B, when a tension is exerted on the fabric, the elastic yarn 60, placed at the centre, stretches, whereas the high tenacity yarn 62 on the periphery deforms, coming closer to the elastic yarn 60. If the tension exceeds the deformation possibilities of the elastic yarn 60, which is situated at the centre, the yarn with high tenacity 62 is then tight and then confers a very high mechanical strength to the fabric thereby constituted.

During a frontal impact of the airplane, the cushioning of the head of a passenger on the rear of the backrest of the seat in front is all the more efficient the more elastic the textile part. In the same way, during a downward impact, the cushioning of the passenger takes place at the level of the seat portion of the seat, and is all the more efficient the more elastic the strip added under the seat portion. In fact, the cushioning is based on a transfer of the kinetic energy from the passenger into elastic energy of the textile part. The impact of the passenger is minimised, in other words the force transmitted to the passenger in going from cruising speed to stopped, while spreading out the cushioning over as large a time scale as possible. A sufficiently low elasticity constant, which comes down to having a quite elastic textile, thus makes it possible to spread out over time the impact and to minimise the impact felt by the passenger. The tenacity of the fibres used to constitute the yarn or the yarns, divided by the linear density of the fibres, defines the strength of the textile, which does not tear during the impact. The textile may thus withstand the impact of a passenger launched at full speed, in the event of an aeronautic crash of the airplane, by frontal impact, or during a downward impact in the case of the strip situated under the seat portion.

The breaking strength is in general low for elastic fibres. The elasticity is obtained by enabling the individual filaments to slide in relation to each other, within a same yarn. Low cohesion between the filaments is a problem when resisting breakage because the individual filaments come apart at low force levels. The use of yarns with very high tenacity, such as aramid fibres (Kevlar® or Twaron®), polyetherimide fibres (Ultem®), polyetherketone fibres (PEEK®), polyamide fibres (Nylon®), natural fibres (linen, hemp or jute) or high molecular weight polyethylene fibres (Dyneema® or Spectra®), enables these contradictory characteristics of elasticity and tenacity to be combined, and does so thanks to the form of the elastic knitting, or to the use of a mixed weaving. Knitting is a shaping of the yarn into stitches, only using single yarn for the whole textile. The use of a single yarn of large size guarantees the mechanical strength of the whole, while avoiding the rupture points of the yarn. The Jersey stitch used makes it possible to obtain this elasticity by virtue of its structure, independently of the elasticity of the yarn. Alternatively, the use of a weaving combining an elastic yarn and a loose yarn with high tenacity makes it possible to arrive at the same result. The use of an elastic structure and a high tenacity yarn makes it possible to combine a low deceleration for the passenger and an excellent mechanical strength of the textile part.

The invention claimed is:

1. A seat for an airplane comprising:
   a skeleton comprising a hollow tubular structure providing mechanical strength of a structure of the seat, and
   a first part forming a backrest of the seat and a second part forming a seat portion of the seat, the first part and the second part being configured to be in direct contact with a passenger seated on the seat and also being more flexible than the skeleton,
   wherein the skeleton comprises a void in a middle of the backrest, wherein the seat comprises a reinforcing strip placed behind the backrest and situated set back in relation to the backrest, wherein the reinforcing strip is made of energy absorbing textile, wherein the reinforcing strip is configured to absorb a rocking of a head of a passenger situated on another seat behind the seat, in the event of frontal impact of the airplane, and wherein the energy absorbing textile of the reinforcing strip is more elastically deformable and of a higher tenacity than the backrest.

2. The seat according to claim 1, wherein the backrest comprises a concave rear face to provide a space for a deformation of the reinforcing strip.

3. The seat according to claim 1, wherein the reinforcing strip consists of a textile comprising a high tenacity yarn which is shaped to constitute a textile that is more deformable than the backrest.

4. The seat according to claim 1, wherein the energy absorbing textile of the reinforcing strip consists of a knitting of single yarn structure.

5. The seat according to claim 4, wherein the knitting is of the Jersey stitch type.

6. The seat according to claim 4, wherein the knitting consists of several yarns in parallel.

7. The seat according to claim 1, wherein the energy absorbing textile of the reinforcing strip is woven with weft yarns and warp yarns.

8. The seat according to claim 7, wherein the weft yarns and the warp yarns comprise approximately a same breaking strength.

9. The seat according to claim 7, wherein the weft yarns and the warp yarns consist of an elastic yarn surrounded by a yarn with high tenacity that is loosely wound.

10. The seat according to claim 9, wherein the elastic yarn comprises a polyamide.

11. The seat according to claim 1, wherein the energy absorbing textile of the reinforcing strip consists of yarn made of a material selected from the group consisting of polyetherimide fibres, polyetherketone fibres, high molecular weight polyethylene fibres, meta- and para-aramid fibres, natural fibres and polyamide fibres.

12. The seat according to claim 1, wherein the reinforcing strip is arranged in a middle of the backrest between opposing sides of the skeleton.

13. The seat according to claim 12, wherein the reinforcing strip comprises a wide portion and a narrow portion, wherein the wide portion is arranged above the narrow portion at a top region of the backrest.

14. The seat according to claim 12, wherein the reinforcing strip extends from a bottom of the backrest to a top of the backrest along the middle of the backrest.

15. The seat according to claim 14, wherein the reinforcing strip extends only along the middle of the backrest.

16. The seat according to claim 15, wherein the reinforcing strip comprises a wide portion and a narrow portion, wherein the wide portion is arranged above the narrow portion at a top region of the backrest.

\* \* \* \* \*